United States Patent
Kawase et al.

(10) Patent No.: US 11,115,446 B2
(45) Date of Patent: Sep. 7, 2021

(54) CHAT SYSTEM AND CHAT MANAGEMENT APPARATUS

(71) Applicant: WingArc1st Inc., Tokyo (JP)

(72) Inventors: Yasuhiro Kawase, Tokyo (JP); Hironori Watanabe, Tokyo (JP); Takahito Abe, Tokyo (JP)

(73) Assignee: WingArc1st Inc., Tokyo (JP)

( * ) Notice: Subject to any disclaimer, the term of this patent is extended or adjusted under 35 U.S.C. 154(b) by 0 days.

(21) Appl. No.: 17/101,973

(22) Filed: Nov. 23, 2020

(65) Prior Publication Data

US 2021/0160292 A1    May 27, 2021

(30) Foreign Application Priority Data

Nov. 26, 2019 (JP) .............................. JP2019-212888

(51) Int. Cl.
  *G06F 15/16* (2006.01)
  *H04L 29/06* (2006.01)
  *H04L 29/08* (2006.01)

(52) U.S. Cl.
  CPC ...... *H04L 65/4046* (2013.01); *H04L 65/1069* (2013.01); *H04L 65/4015* (2013.01); *H04L 67/1031* (2013.01)

(58) Field of Classification Search
  CPC ............. H04L 65/4046; H04L 65/1069; H04L 65/4015; H04L 67/1031

USPC ................................................. 709/203–204
See application file for complete search history.

(56) References Cited

U.S. PATENT DOCUMENTS

| 8,725,819 | B2 * | 5/2014 | Fujihara ............... H04L 12/1818 709/206 |
| 10,798,034 | B2 * | 10/2020 | Beust ...................... H04W 4/08 |
| 2007/0174399 | A1 * | 7/2007 | Ogle ........................ H04L 51/04 709/206 |
| 2012/0110099 | A1 | 5/2012 | Fujihara et al. |

FOREIGN PATENT DOCUMENTS

| JP | 5534469 B2 | 7/2014 |
| WO | WO 2010/110155 A1 | 9/2010 |

* cited by examiner

*Primary Examiner* — Duyen M Doan
(74) *Attorney, Agent, or Firm* — Polsinelli PC

(57) ABSTRACT

A chat management apparatus allocates a plurality of chat rooms to talk servers in a distributed manner, and performs a control operation to switch to another talk server and deliver content when a failure occurs in one talk server. Further, by providing content posted from a user terminal to a history data storage unit, which is an independent external storage apparatus different from the talk servers, and storing the content, it makes unnecessary to perform synchronization processing of content data posted on a chat room even when the plurality of chat rooms is made redundant and managed in the plurality of talk servers in a distributed manner as a countermeasure against a failure.

14 Claims, 7 Drawing Sheets

CHAT SYSTEM AND CHAT MANAGEMENT APPARATUS

CROSS REFERENCE TO RELATED APPLICATIONS

This application claims priority to Application No. 2019-212888 filed in Japan on Nov. 26, 2019. The entire contents of this application are hereby incorporated by reference.

BACKGROUND OF THE INVENTION

Field of the Invention

The present invention relates to a chat system and a chat management apparatus, and is particularly suitable for use in a chat system in which a plurality of chat rooms is managed on a plurality of servers in a distributed manner.

Description of the Related Art

In recent years, business chat has been used for various business operations. Business chat is mainly intended to facilitate communication in a company by using chat instead of e-mail, and has functions such as business task management, schedule management, efficient information sharing, workflow management, and automatic document creation in addition to business communication by chat. In general, a chat room is set in a chat system, and messages are exchanged between users who participate in the chat room.

Conventionally, there has been known a chat system in which a plurality of chat rooms is managed on a plurality of matching servers in a distributed manner (for example, see Japanese Patent No. 5,534,469). In the chat system described in Japanese Patent No. 5,534,469, a client terminal selects one matching server from the plurality of matching servers according to a predetermined correspondence specified so that the chat rooms are evenly allocated to the plurality of matching servers in a distributed manner.

The above-mentioned Japanese Patent No. 5,534,469 discloses that the chat rooms are managed so as to be evenly allocated to the plurality of matching servers in a distributed manner. However, there is no description on a method for dealing with a case where a failure occurs in any of the matching servers. Note that as a countermeasure against failures, it is common to make the servers redundant and configure a system to switch to a standby system server when a failure occurs in an active system server. However, when data synchronization processing is constantly performed between the active system server and the standby system server in preparation for switching when a failure occurs, some of computational resources of the active system server performing various chat-related processes (hereinafter, simply referred to as chat processes) is taken away by the synchronization processing. Therefore, problems arise in that the response performance of the chat processes, which is essential, is impaired, and the service quality deteriorates.

As described in Japanese Patent No. 5,534,469, the chat rooms may be dynamically opened and dynamically closed. In addition, the number of participants and the number of posted contents for each chat room dynamically change. However, Japanese Patent No. 5,534,469 fails to specify a specific scheme of executing a process to evenly distribute and allocate the plurality of chat rooms whose states can dynamically change in this way to the plurality of matching servers. Therefore, the processing load of some matching servers may increase depending on the dynamically changing state. In this case, problems arise in that the response performance of the chat process related to the chat room allocated to some of the matching servers is impaired, and the service quality deteriorates.

SUMMARY OF THE INVENTION

The invention has been made to solve such a problem, and an object of the invention is to make it possible to suppress impairing of response performance of a chat process as much as possible in a chat system configured such that a plurality of chat rooms is managed on a plurality of servers in a distributed manner.

To solve the above-mentioned problem, a chat system of the invention includes a plurality of talk servers, a gateway apparatus that allocates and delivers content posted from a user terminal to the plurality of talk servers, and a chat management apparatus that controls the plurality of talk servers and the gateway apparatus. Here, each of the plurality of talk servers performs a process of setting one or more chat rooms under control of the chat management apparatus, receiving content, which is posted from a user terminal of a user belonging to a chat room via the gateway apparatus, by the corresponding chat room, supplying the received content to an independent external storage apparatus different from the plurality of talk servers and storing the content in a database. The gateway apparatus delivers the content posted from the user terminal of the user belonging to the chat room to a talk server in which the corresponding chat room is set.

In the chat system configured as described above, in one aspect of the invention, the chat management apparatus includes a room allocation unit that allocates a plurality of chat rooms to the plurality of talk servers in a distributed and redundant manner, and a delivery destination control unit that controls the gateway apparatus so that a delivery destination of the content posted from the user terminal of the user belonging to the chat room is set to the talk server in which the corresponding chat room is set according to allocation by the room allocation unit. Further, the delivery destination control unit monitors an operating status of the plurality of talk servers, and controls the gateway apparatus so that when it is detected that a failure has occurred in one of the talk servers, the content is delivered by switching from the one talk server to another talk server.

In another aspect of the invention, a chat management apparatus includes a room allocation unit that allocates a plurality of chat rooms to a plurality of talk servers in a distributed manner so that processing loads on the plurality of talk servers satisfy a predetermined condition related to uniformity, and a delivery destination control unit that controls a gateway apparatus so that a delivery destination of content posted from a user terminal of a user belonging to a chat room is set to a talk server in which the corresponding chat room is set according to allocation by the room allocation unit. Further, the room allocation unit monitors the processing loads on the plurality of talk servers, re-executes allocation of the plurality of chat rooms to the plurality of talk servers to satisfy the predetermined condition related to uniformity when it is detected that the processing loads on the plurality of talk servers do not satisfy the predetermined condition related to uniformity, and resets one or more chat rooms in a talk server according to allocation after re-execution, and the delivery destination control unit controls the gateway apparatus to switch a talk server to which the content is delivered.

According to the invention configured as described above, since each of contents posted from the user terminals on the chat rooms of the plurality of talk servers is provided to and stored in the independent external storage apparatus different from the talk servers, contents supplied from the respective talk servers are stored in the external storage apparatus in an aggregated manner. Therefore, as in the one aspect of the invention, even when a plurality of chat rooms is made redundant in a plurality of talk servers as a countermeasure against a failure, it is unnecessary to perform synchronization processing of content data posted on a chat room between talk servers. Therefore, it is possible to suppress impairing of response performance of a chat process as much as possible without some of computational resources of the talk servers performing the chat process taken away by synchronization processing.

In addition, as in the other aspect of the invention, in a case where the plurality of chat rooms is allocated to the plurality of talk servers in a distributed manner so that the processing loads on the plurality of talk servers satisfy the predetermined condition related to uniformity, even when the processing loads of some talk servers increase depending on the dynamically changing state of the chat rooms, if the processing loads do not satisfy the predetermined condition related to uniformity, allocation of the plurality of chat rooms to the plurality of talk servers is re-executed to satisfy the predetermined condition. As a result, according to the dynamically changing state of the chat rooms, allocation of the plurality of chat rooms is dynamically changed, and the state is maintained to satisfy the predetermined condition related to uniformity. Therefore, it is possible to suppress impairing of the response performance of the chat process as much as possible. Further, it is unnecessary to perform data synchronization processing when chat room allocation is re-executed. In this regard, it is possible to suppress impairing of the response performance of the chat process as much as possible.

DETAILED DESCRIPTION OF THE INVENTION

First Embodiment

Figure 1:
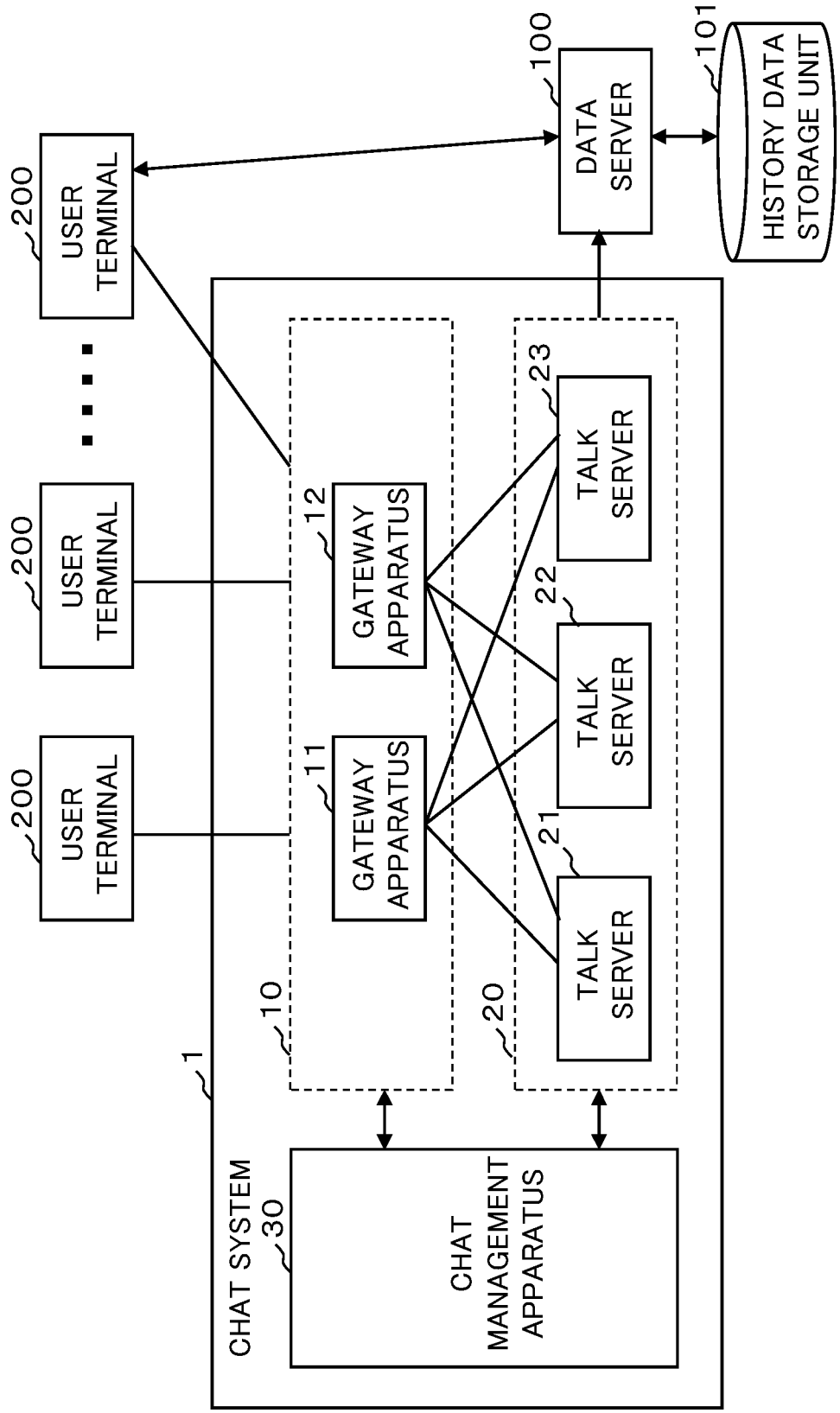
FIG. 1 is a diagram illustrating a configuration example of a chat system according to a first embodiment.

Hereinafter, a first embodiment of the invention will be described with reference to the drawings. FIG. 1 is a diagram illustrating a configuration example of a chat system 1 according to the first embodiment. As illustrated in FIG. 1, the chat system 1 according to the first embodiment includes a plurality of gateway apparatuses 11 and 12, a plurality of talk servers 21, 22, and 23, and a chat management apparatus 30. In the following, the plurality of gateway apparatuses 11 and 12 may be referred to as a gateway apparatus group 10, and the plurality of talk servers 21, 22 and 23 may be referred to as a talk server group 20.

The gateway apparatus group 10, the talk server group 20, and the chat management apparatus 30 are connected by, for example, a local area network (LAN). Further, predetermined communication is performed between the gateway apparatus group 10 and the chat management apparatus 30, between the talk server group 20 and the chat management apparatus 30, and between the gateway apparatus group 10 and the talk server group 20. Details of content of this communication will be described later. In the present embodiment, it is unnecessary to perform communication between the plurality of gateway apparatuses 11 and 12, and it is unnecessary to perform communication between the plurality of talk servers 21, 22 and 23.

Each of the plurality of talk servers 21, 22, and 23 is connected to a data server 100. The talk server group 20 and the data server 100 are connected by a LAN other than the above-mentioned LAN or a wide area network such as the Internet. The data server 100 is configured as a system different from the chat system 1 of the present embodiment, and stores and manages data of various contents exchanged in the chat system 1 in a history data storage unit 101. Examples of the content include a message posted from the user terminals 200, various files such as a document, an image, and a sound assigned to the message, etc.

Note that the LAN or the wide area network described above is only an example, and a connection form is not limited to the above examples.

As described above, the present embodiment adopts not a mode in which the plurality of talk servers 21, 22, and 23 stores and saves data of contents posted thereon in the talk servers 21, 22, and 23, respectively, but a mode in which the plurality of talk servers 21, 22, and 23 supplies the data to the history data storage unit 101, which is an external storage apparatus different and independent from the talk server group 20, and causes the history data storage unit 101 to store the data. In this way, the data of the contents posted from the plurality of user terminals 200 to the plurality of talk servers 21, 22, and 23 in a distributed manner are stored in the history data storage unit 101 in an aggregated manner. Note that the history data storage unit 101 may not be a physically single storage medium. That is, it is sufficient to adopt a mode in which the data of the contents posted on the plurality of talk servers 21, 22, and 23 is stored in the history data storage unit 101 as an external storage apparatus in an aggregated manner, and the history data storage unit 101 may be a physically single storage medium or a plurality of storage media.

For example, the plurality of user terminals 200 includes a mobile terminal such as a smartphone, a tablet terminal, or a notebook personal computer, or a stationary personal computer. An application program (hereinafter referred to as a chat application) for using a chat function provided by the chat system 1 is installed in the user terminals 200.

The user terminals 200 can be connected to the chat system 1 via a wide area network such as the Internet or a mobile phone network using the chat application, and can access the chat system 1 to perform a chat. Further, the plurality of user terminals 200 can be connected to the data server 100 via a wide area network such as the Internet or a mobile phone network, and can access the data server 100 to view a history of the chat saved in the history data storage unit 101.

Each of the plurality of talk servers 21, 22, and 23 performs various processes related to chat (chat processes). Each of the plurality of gateway apparatuses 11 and 12 allocates and delivers contents posted from the user terminal 200 to the plurality of talk servers 21, 22, and 23. That is, content posted from the user terminal 200 is delivered to any one of the talk server group 20 (one to which a chat room in which a user is participating is set) via any one of the gateway apparatus group 10. Note that it is possible to arbitrarily determine any one of the plurality of gateway apparatuses 11 and 12 through which the content posted from the user terminal 200 is passed. As an example, posts from the plurality of user terminals 200 are appropriately allocated to the plurality of gateway apparatuses 11 and 12 by a load balancer.

In the following description, when any one of the gateway apparatus group 10 is described, the one will be denoted by a gateway apparatus 10*, and when any one of the talk server group 20 is described, the one will be denoted by a talk server 20*. Similarly, when any one of the plurality of user terminals 200 is described, the one will be denoted by a user terminal 200*.

The talk server 20* receiving delivery of content posted by a user belonging to a certain chat room notifies user terminals 200 of a plurality of users belonging to the chat room that posting of the content has been received via the gateway apparatus 10* corresponding to a delivery source. This notification may present content of a posted message. In the chat system 1 of the present embodiment, to enable a chat process including posting of content from the user terminal 200 to the talk server group 20 and post reception notification for replying from the talk server group 20 to the user terminal 200 as a response to the posting to be performed without delay, the user terminal 200 and the talk server group 20 are kept in a constant connection state or a state close to constant connection by frequent connection.

Further, the talk server 20* receiving delivery of content from the user terminal 200 supplies the content to the data server 100. The data server 100 stores and saves the content supplied from the talk server 20* in the history data storage unit 101. As described above, the data server 100 is configured as a system different from the chat system of the present embodiment, and a process related to viewing a past chat history stored in the history data storage unit 101 is performed by the data server 100 different from the talk server group 20. In this way, the computational resources of the talk server group 20 are not taken away by the process related to viewing the history, so that the response performance (real-time property) of the chat process performed by the talk server group 20 can be improved.

The chat management apparatus 30 controls the plurality of gateway apparatuses 11, 12 and the plurality of talk servers 21, 22, and 23. That is, the chat management apparatus 30 performs a control operation to determine one of the gateway apparatuses 11 and 12 receiving the content posted from the user terminal 200 and one of the talk servers 21, 22 and 23 to which the content is delivered. In addition, the chat management apparatus 30 controls allocation of chat room setting in the plurality of talk servers 21, 22, and 23.

Figure 2A:
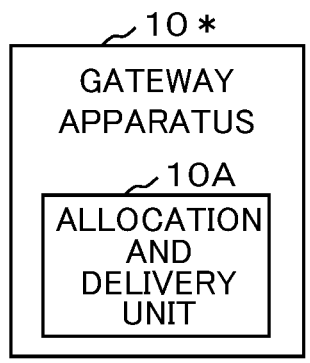
FIGS. 2A, 2B, and 2C are block diagrams illustrating functional configuration examples of a gateway apparatus, a talk server, and a chat management apparatus according to the first embodiment.
Figure 2B:
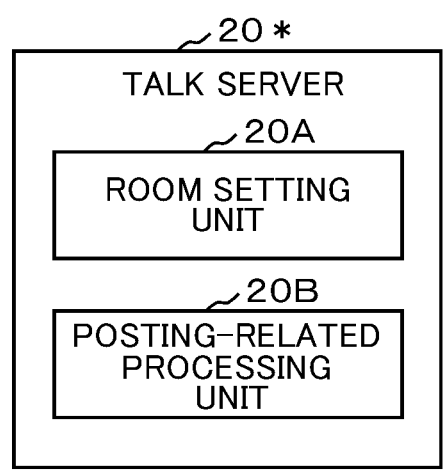
Figure 2C:
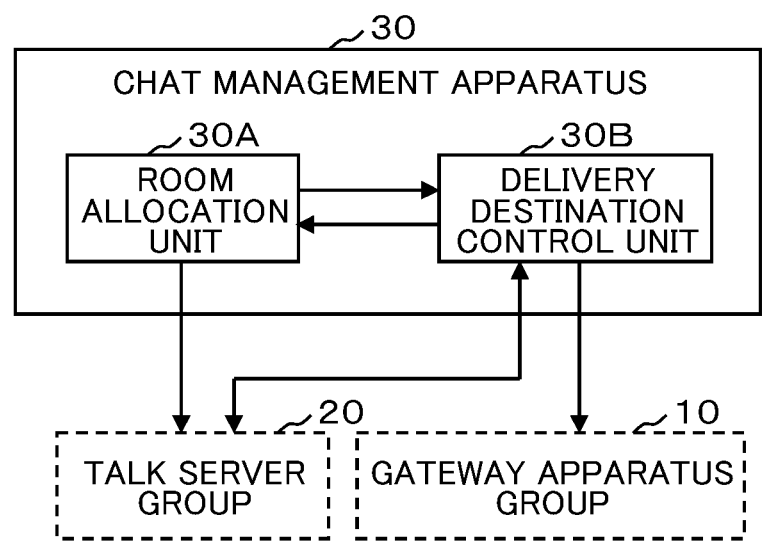

FIGS. 2A, 2B, and 2C are block diagrams illustrating functional configuration examples of the gateway apparatus 10* (the same configuration for each of the gateway apparatuses 11 and 12), the talk server 20* (the same configuration for each of the talk servers 21, 22 and 23), and the chat management apparatus 30. As illustrated in FIG. 2A, the gateway apparatus 10* includes an allocation and delivery unit 10A as a functional configuration. Further, as illustrated in FIG. 2B, the talk server 20* includes a room setting unit 20A and a posting-related processing unit 20B as a functional configuration. Further, as illustrated in FIG. 2C, the chat management apparatus 30 includes a room allocation unit 30A and a delivery destination control unit 30B as a functional configuration.

Each of the functional blocks 10A, 20A, 20B, 30A, and 30B can be configured by any of hardware, a digital signal processor (DSP), and software. For example, in the case of being configured by software, each of the functional blocks 10A, 20A, 20B, 30A, and 30B actually includes a CPU, a RAM, a ROM, etc. of a computer and is implemented by operating a program stored in a recording medium such as a RAM, a ROM, a hard disk, or a semiconductor memory.

The room setting unit 20A of the talk server 20* sets one or more chat rooms in the talk server 20* under the control of the chat management apparatus 30. The room allocation unit 30A of the chat management apparatus 30 sets an active system and a standby system for each of the plurality of chat rooms, allocates a plurality of active system chat rooms to the plurality of talk servers 21, 22, and 23 in a distributed manner, and allocates a plurality of standby system chat rooms to the plurality of talk servers 21, 22, and 23 in a distributed manner. In this instance, the room allocation unit 30A allocates the plurality of standby system chat rooms to the plurality of talk servers 21, 22, and 23 in a distributed manner so that these talk servers are not the same as the talk servers of the corresponding active system chat rooms.

A user using the user terminal 200 can create a new chat room or join an existing chat room through a function of a chat application during chatting. When a new chat room is created by a certain user, the chat room is allocated to any of the talk servers 21 to 23 (that is, a talk server 20*) by the room allocation unit 30A, and the user is registered in the new chat room. In addition, when a certain user applies for participation in an existing chat room, that user is registered in the existing chat room. Such a chat room creation process and a user registration process for the chat room are performed by the chat management apparatus 30.

Figure 3:
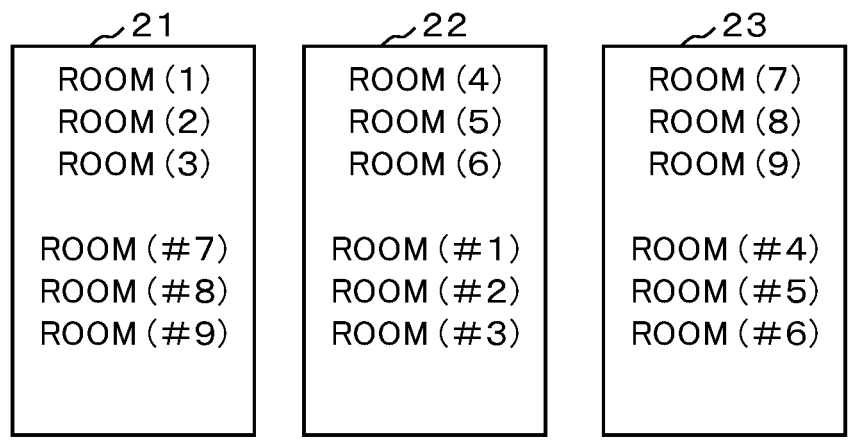
FIG. 3 is a diagram schematically illustrating an example of allocating a chat room according to the first embodiment.

FIG. 3 is a diagram schematically illustrating an example of allocating a plurality of chat rooms to the plurality of talk servers 21, 22, and 23. Here, for the sake of description, an example is illustrated in which nine chat rooms are allocated to three talk servers 21, 22, and in a distributed manner. In FIG. 3, the chat rooms numbered (1) to (9) are the active system, and the chat rooms numbered (#1) to (#9) are the standby system. Further, the active system and the standby system with the same number have a 1:1 correspondence.

An active system chat room is used by the talk servers 21, 22, and 23 for a chat process during normal operation in which no failure occurs in the talk servers 21, 22, and 23. A standby system chat room is not used during normal operation, and is used in place of the active system when a failure occurs in a talk server 20*. In the present embodiment, the standby system chat room is kept in an activated state. However, the standby system chat room is not synchronized with the active system, and has a configuration of a warm standby scheme in which switching from the active system is performed when a failure occurs.

In the example of FIG. 3, the three active system chat rooms (1) to (3) are allocated to the first talk server 21, the three active system chat rooms (4) to (6) are allocated to the second talk server 22, and the three active system chat rooms (7) to (9) are allocated to the third talk server 23. In addition, the three standby system chat rooms (#1) to (#3) are allocated to the second talk server 22, the three standby system chat rooms (#4) to (#6) are allocated to the third talk server 23, and the three standby system chat rooms (#7) to (#9) are allocated to the first talk server 21.

Here, an example is illustrated in which a plurality of standby system chat rooms corresponding to a plurality of active system chat rooms allocated to one talk server 20* is allocated to one talk server 20*. However, the invention is not limited thereto. That is, it is sufficient to prevent a plurality of standby system chat rooms from being allocated to the same talk server as that of the corresponding active system chat rooms. For example, the three standby system chat rooms (#1) to (#3) corresponding to the three active system chat rooms (1) to (3) allocated to the first talk server 21 may be allocated to the other two talk servers 22 and 23 in a distributed manner. This description is similarly applied to the other chat rooms (4) to (9) and (#4) to (#9).

During normal operation in which no failure occurs in the three talk servers 21, 22, and 23, the chat process is performed using the active system chat rooms (1) to (9) allocated to the three talk servers 21, 22, and 23 in a distributed manner. On the other hand, when a failure occurs in any of the talk servers 21 to 23 (that is, a talk server 20*), an active system chat room allocated to the talk server 20* is switched to a standby system chat room to continue the chat process. For example, when a failure occurs in the first talk server 21, the active system chat rooms (1) to (3) allocated to the first talk server 21 are switched to the standby system chat room (#1) to (#3) allocated to the second talk server 22 to continue the chat process.

When switching from the active system chat room to the standby system chat room in response to occurrence of a failure in any of the talk servers 21 to 23 (that is, a talk server 20*), it is unnecessary to perform synchronization processing on content data exchanged through the chat process up to this point. As described above, the content data received from the user terminals 200 by the plurality of talk servers 21, 22, and 23 is supplied to the data server 100, and is saved in the history data storage unit 101 in an aggregated manner. Therefore, for example, when a failure occurs in the first talk server 21, it is unnecessary to copy content data related to the chat rooms (1) to (3) from the first talk server 21 to the second talk server 22 by synchronization processing.

Further, the user terminal 200 and the talk server group 20 are in a constant connection state or a state close thereto. However, when switching from the active system chat room to the standby system chat room in response to occurrence of a failure in any of the talk servers 21 to 23 (that is, a talk server 20*), communication between the user terminal 200 and the gateway apparatus group 10 is not interrupted. Only communication between one of the gateway apparatuses 10 and one of the talk servers 20 involved in switching of the chat room is interrupted for a short time, and communication is immediately allowed after switching from the active system chat room to the standby system chat room is completed. Therefore, even when a failure occurs in the chat server 20* where the chat room in which a user participates is set, the user can continue chatting only by experiencing a temporary decrease in performance without feeling that connection with the chat system 1 has become impossible.

The delivery destination control unit 30B of the chat management apparatus 30 controls the gateway apparatuses 11 and 12 so that a delivery destination of content posted from the user terminal 200 of the user belonging to the chat room is set to a talk server in which the corresponding chat room is set according to allocation by the room allocation unit 30A. During normal operation in which no failure occurs in the talk servers 21, 22, and 23, the delivery destination control unit 30B controls the gateway apparatuses 11 and 12 so that the talk server in which the active system chat room is set is set as the delivery destination of the content.

In the example in which nine chat rooms are allocated as illustrated in FIG. 3, with regard to content posted from the user terminal 200 of the user belonging to the first chat room, the first talk server 21 in which the active system chat room (1) is set is set as a delivery destination in the gateway apparatuses 11 and 12. Similarly, with regard to content posted from the user terminal 200 of the user belonging to the fourth chat room, the second talk server 22 in which the active system chat room (4) is set is set as a delivery destination in the gateway apparatuses 11 and 12.

The allocation and delivery unit 10A of the gateway apparatus 10* delivers the content posted from the user terminal 200 of the user belonging to the chat room to the talk servers 21, 22, and 23 in which the corresponding chat room is set. In the example in which nine chat rooms are allocated as in FIG. 3, during normal operation in which no failure occurs in the talk servers 21, 22, and 23, for example, the allocation and delivery unit 10A delivers the content posted from the user terminal 200 of the user belonging to the first chat room to the first talk server in which the active system chat room (1) is set. Similarly, the allocation and delivery unit 10A delivers the content posted from the user terminal 200 of the user belonging to the fourth chat room to the second talk server 22 in which the active system chat room (4) is set.

The posting-related processing unit 20B of the talk server 20* receives the content posted from the user terminal 200 of the user belonging to the chat room via the gateway apparatuses 11 and 12 by the corresponding chat room, supplies the received content to the data server 100, and causes a database of the history data storage unit 101 to store the content. Further, as described above, the posting-related processing unit 20B notifies the user terminal 200 via the gateway apparatuses 11 and 12 that posting of the content has been received.

The delivery destination control unit 30B of the chat management apparatus 30 monitors an operating status of the plurality of talk servers 21, 22, and 23. In the case of detecting that a failure has occurred in one talk server 20*, the delivery destination control unit 30B controls the gateway apparatuses 11 and 12 so that content is delivered by switching from the one talk server 20* to another talk server 20* in which a standby system chat room corresponding to an active system chat room set in the one talk server 20* is set. For example, in the example in which nine chat rooms are allocated as in FIG. 3, in the case of detecting that a failure has occurred in the first talk server 21 in which the active system chat rooms (1) to (3) are set, the delivery destination control unit 30B controls the gateway apparatuses 11 and 12 so that a posting destination of content posted from the user terminal 200 of the user belonging to the first to third chat rooms is switched to the second talk server 22 in which the standby system chat rooms (#1) to (#3) are set.

Figure 4:
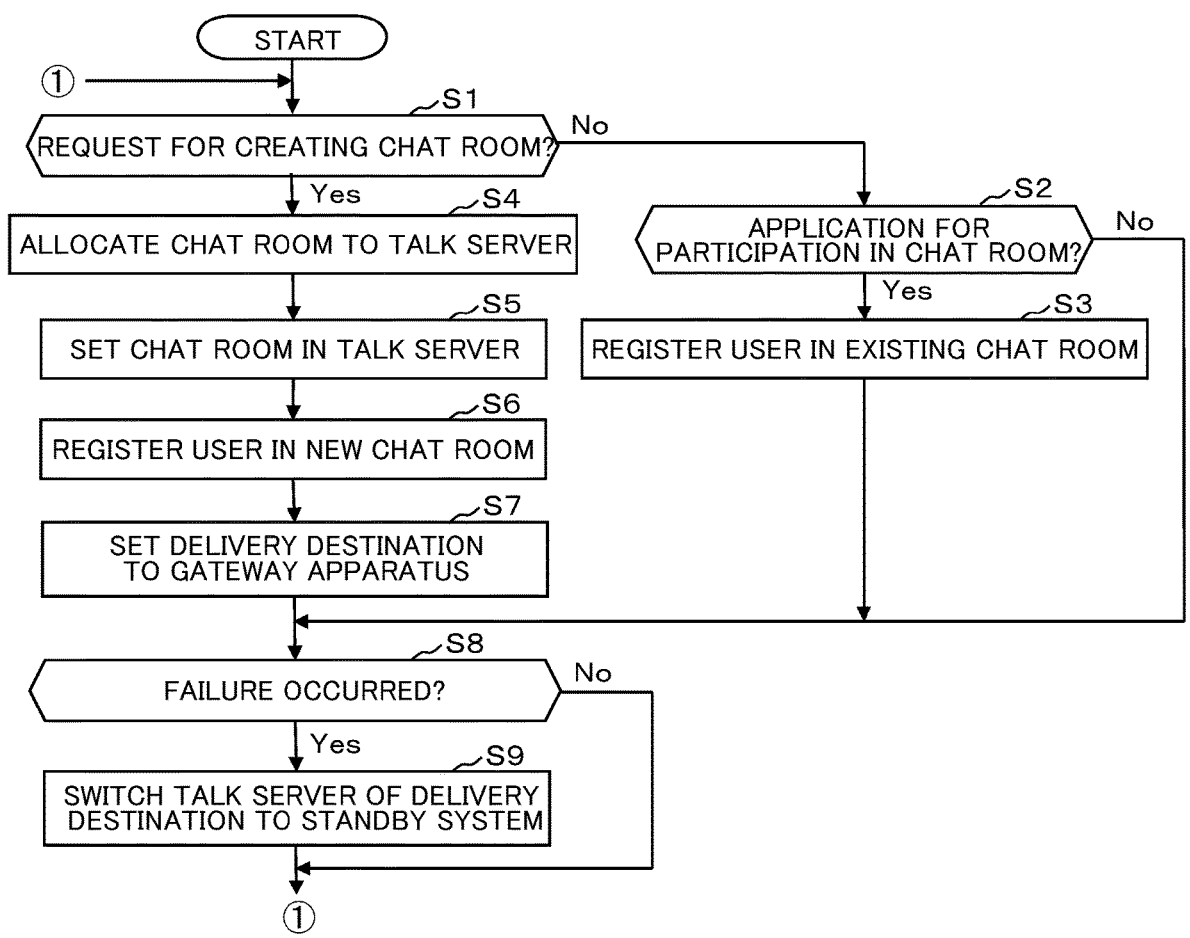
FIG. 4 is a flowchart illustrating an operation example of the chat system according to the first embodiment.

FIG. 4 is a flowchart illustrating an operation example of the chat system 1 according to the first embodiment configured as described above. The flowchart illustrated in FIG. 4 is continuously executed while the chat system 1 is operating. Note that in FIG. 4, processing related to posting content and viewing a chat history is omitted.

First, the chat management apparatus 30 determines whether or not there is a request for creating a chat room from the user terminal 200 (step S1). When there is no request for creating a chat room, the chat management apparatus 30 further determines whether or not the user terminal 200 has applied for participation in an existing chat room (step S2). When there is an application for participation in an existing chat room, the chat management apparatus 30 registers the user applying for participation as a participant in the existing chat room (step S3). Thereafter, the process proceeds to step S8. Further, even when it is determined in step S2 that there is no application for participation in the existing chat room, the process proceeds to step S8.

When the chat management apparatus 30 determines in step S1 that there is a request for creating a chat room, the room allocation unit 30A creates a new chat room for each of the active system and the standby system, allocates an active system chat room to any of the talk serves 21 to (that is, a talk server 20*), and allocates a standby system chat room to another talk server 20* different from that of the active system chat room (step S4).

Subsequently, the room setting unit 20A of each of the talk servers 21, 22, and 23 sets a newly created chat room according to allocation by the room allocation unit 30A of the chat management apparatus 30 (step S5). Then, the chat management apparatus 30 registers the user who requested for creation of the chat room as a participant of the newly created chat room (step S6).

Further, the delivery destination control unit 30B of the chat management apparatus 30 controls the gateway apparatuses 11 and 12 so that a delivery destination of content posted from the user terminal 200 of the user belonging to the chat room is set to the talk server in which the corresponding active system chat room is set according to allocation by the room allocation unit 30A (step S7). Thereafter, the process proceeds to step S8.

In step S8, the delivery destination control unit 30B of the chat management apparatus 30 monitors the operating status of the plurality of talk servers 21, 22, and 23, and determines whether or not a failure occurs in one talk server 20*. When occurrence of a failure is not detected, the process returns to step S1. On the other hand, when occurrence of a failure in any of the talk servers 21 to 23 (that is, a talk server 20*) is detected, the delivery destination control unit 30B controls the gateway apparatuses 11 and 12 so that content is delivered by switching from the one talk server 20* in which a failure has occurred to another talk server 20* in which a standby system chat room corresponding to an active system chat room set in the one talk server 20* is set (step S9). Thereafter, the process returns to step S1.

As described in detail above, according to the first embodiment, since each of contents posted from the user terminals 200 on the chat rooms of the plurality of talk servers 21, 22, and 23 is provided to and stored in the history data storage unit 101 which is an external storage apparatus of the talk servers 21, 22, and 23, content data supplied from the respective talk servers 21, 22, and 23 is stored in an aggregated manner. Therefore, even when a plurality of chat rooms is made redundant and each of the active system chat rooms and the standby system chat rooms is set on the plurality of talk servers 21, 22, and 23 in a distributed manner as a countermeasure against a failure, it is unnecessary to periodically perform synchronization processing of content data posted on the chat room. In addition, also when switching from the active system to the standby system, it is unnecessary to perform synchronization processing. Therefore, it is possible to suppress impairing of response performance of a chat process as much as possible without some of computational resources of the talk servers 21, 22, and 23 performing the chat process taken away by synchronization processing.

Note that in the first embodiment, a description has been given of continuing a chat process in a case where a failure has occurred in any of the talk servers 21 to 23 (that is, a talk server 20*) by switching from an active system chat room allocated to the talk server 20* to a standby system chat room. In this case, a chat room, which has been the standby system until then, may be switched to the active system, and a standby system chat room corresponding thereto may be newly set for a talk server 20*. For example, when a failure occurs in the first talk server 21 in the example of FIG. 3, the standby system chat rooms (#1) to (#3) allocated to the second talk server 22 are switched to the active system chat rooms (1) to (3), and the standby system chat rooms (#1) to (#3) are newly set for another talk server 20*. According to this configuration, in a situation where it is unknown when the first talk server 21 in which a failure has been occurred is restored, the active system chat room and the standby system chat room can be present at all times.

Further, in the first embodiment described above, a description has been given of an example in which the number of active system chat rooms and the number of standby system chat rooms are the same, that is, an example in which one standby system chat room is set. However, the invention is not limited thereto. For example, a plurality of standby system chat rooms may be set for one active system chat room. In this case, it is preferable to set a plurality of standby system chat rooms in a plurality of different talk servers 20. When a failure occurs in the talk server 20* in which the active system chat room is set, for example, the chat management apparatus 30 detects a load status of a plurality of talk servers 20 in which a plurality of standby system chat rooms is set, and switches to a standby system chat room set in a talk server 20* having a low load status.

Further, it is possible to adopt a configuration of a cold standby scheme that the standby system chat room is not set for the active system chat room. In this case, when a failure occurs in one talk server 20* in which the active system chat room is set, a chat process is continued by switching to another active system chat room set in another talk server 20*. In this configuration, some downtime may be generated during switching. However, the cost (processing time) for constructing a new chat room is low, and falls within an operationally acceptable range.

Second Embodiment

Figure 5:
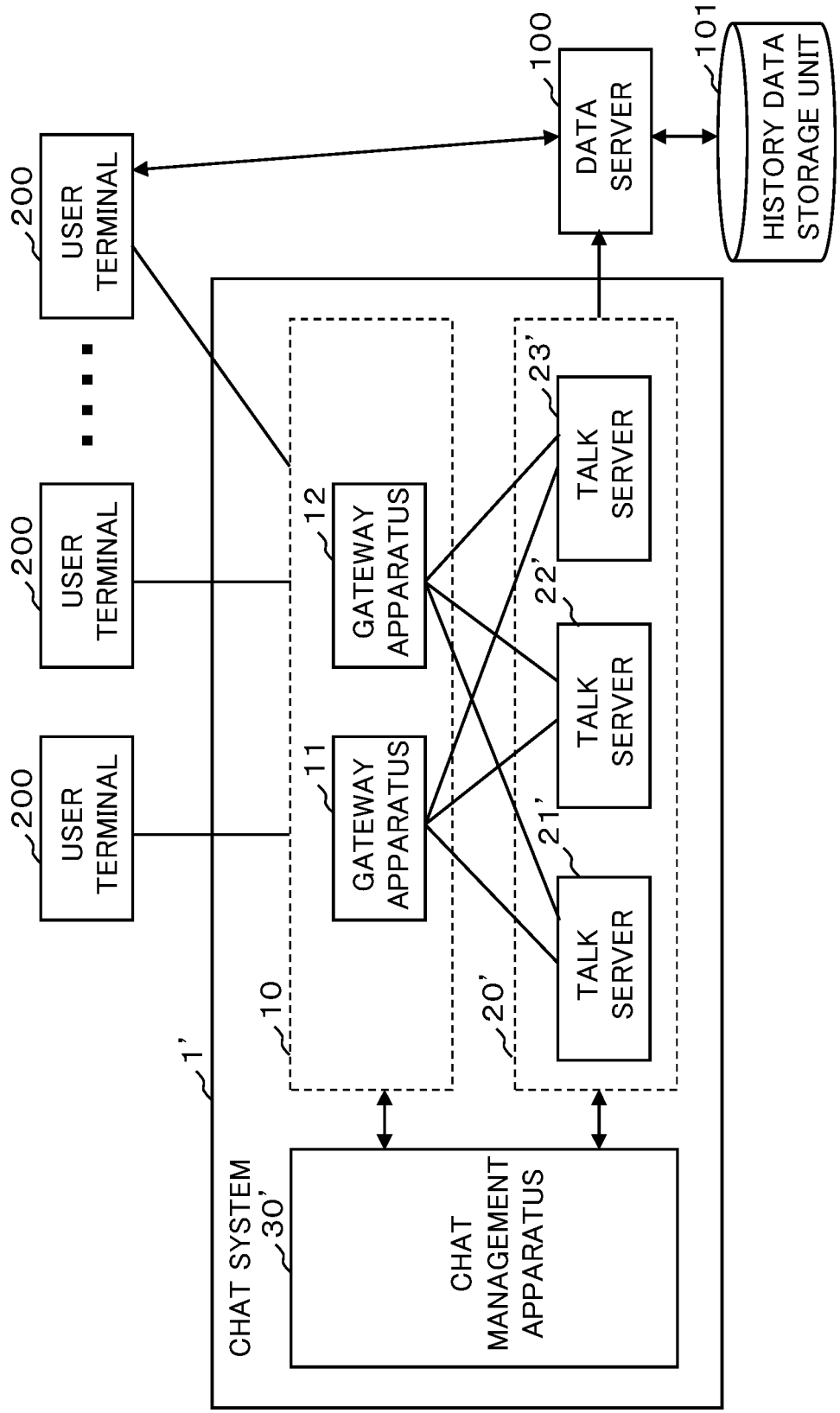
FIG. 5 is a diagram illustrating a configuration example of a chat system according to a second embodiment.

Next, a second embodiment of the invention will be described with reference to the drawings. FIG. 5 is a diagram illustrating a configuration example of a chat system 1' according to the second embodiment. Note that, in FIG. 5, those having the same reference numerals as those illustrated in FIG. 1 have the same functions, and thus duplicate description will be omitted here. Further, in the following description, when any one of a talk server group 20' is described, the one will be denoted by a talk server 20'*.

As illustrated in FIG. 5, the chat system 1' according to the second embodiment includes the plurality of gateway apparatuses 11 and 12, a plurality of talk servers 21', 22', and 23', and a chat management apparatus 30'. In the following, the plurality of talk servers 21', 22', and 23' may be referred to as the talk server group 20'.

Figure 6A:
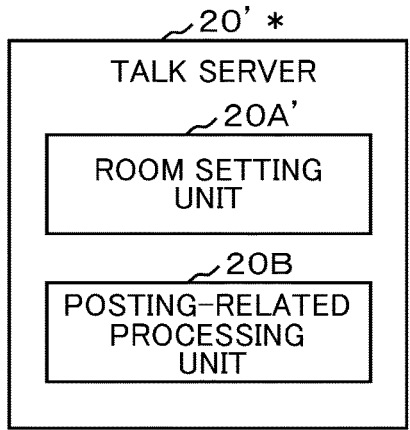
FIGS. 6A and 6B are block diagrams illustrating functional configuration examples of a talk server and a chat management apparatus according to the second embodiment.
Figure 6B:
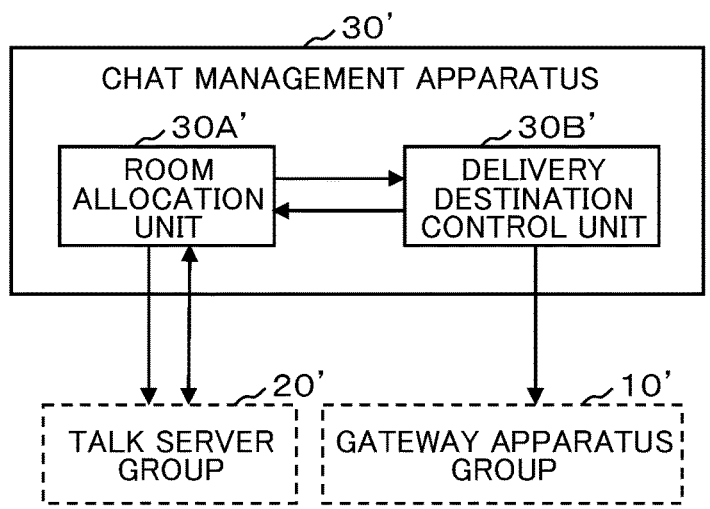

FIGS. 6A and 6B are block diagrams illustrating functional configuration examples of the talk server 20'* (the same configuration for each of the talk servers 21', 22', and 23') and the chat management apparatus 30'. Note that in FIGS. 6A and 6B, those having the same reference numerals as those illustrated in FIGS. 2A to 2C have the same functions, and thus duplicate description will be omitted here. As illustrated in FIG. 6A, the talk server 20'* includes a room setting unit 20A' and the posting-related processing unit 20B as a functional configuration. Further, as illustrated in FIG. 6B, the chat management apparatus 30' includes a room allocation unit 30A' and a delivery destination control unit 30B' as a functional configuration.

Each of the functional blocks 20A', 20B, 30A', and 30B' can be configured by any of hardware, a DSP, and software. For example, in the case of being configured by software, each of the functional blocks 20A', 20B, 30A', and 30B' actually includes a CPU, a RAM, a ROM, etc. of a computer and is implemented by operating a program stored in a recording medium such as a RAM, a ROM, a hard disk, or a semiconductor memory.

The room allocation unit 30A' of the chat management apparatus 30' allocates a plurality of chat rooms to the plurality of talk servers 21', 22', and 23' in a distributed manner so that the processing loads on the plurality of talk servers 21', 22', and 23' satisfy a predetermined condition related to uniformity. For example, the room allocation unit 30A' allocates the plurality of chat rooms to the plurality of talk servers 21', 22', and 23' in a distributed manner to satisfy a predetermined condition that a difference between the processing loads applied to the plurality of talk servers 21', 22', and 23' is equal to or less than a predetermined value.

The processing loads applied to the talk servers 21', 22', and 23' dynamically vary depending on the number of chat rooms set, the number of participants in the chat rooms, the number of contents posted in the chat room, etc. For example, when creating a new chat room and allocating the created chat room to any of the talk serves 21' to 23' (that is, a talk server 20'*), the room allocation unit 30A' actually measures the processing loads on the plurality of talk servers 21', 22', and 23', and allocates the new chat room to a talk server 20'* having a smallest processing load, so that the difference between the processing loads applied to the plurality of talk servers 21', 22', and 23' becomes equal to or less than the predetermined value. Note that the chat room may not be allocated to the talk server 20'* having the smallest processing load, and it is sufficient that the difference between the processing loads becomes equal to or less than the predetermined value.

Note that even though an example of actually measuring the processing loads on the plurality of talk servers 21', 22', and 23' has been described here, the invention is not limited thereto. For example, the processing loads may be estimated according to a predetermined function based on the number of chat rooms set in the plurality of talk servers 21', 22', and 23' and the number of participants in the chat rooms. Further, the processing loads may be estimated according to a predetermined function based on the number of contents stored in the history data storage unit 101 for each chat room in addition to the number of chat rooms and the number of participants in the chat rooms.

Figure 7:
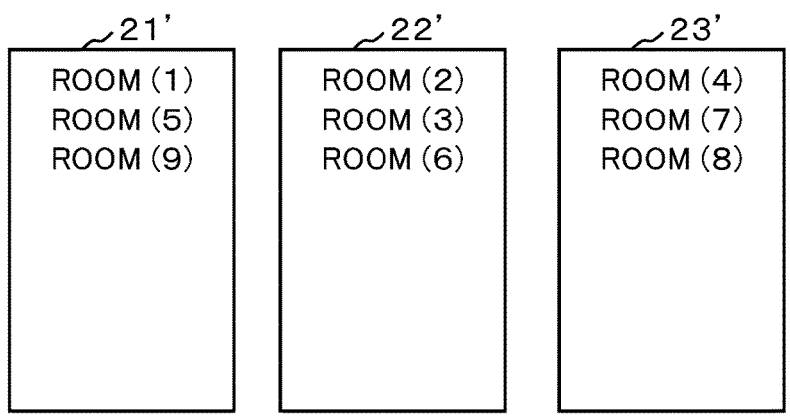
FIG. 7 is a diagram schematically illustrating an example of allocating a chat room according to the second embodiment.

FIG. 7 is a diagram schematically illustrating an example of allocating a plurality of chat rooms to the plurality of talk servers 21', 22', and 23'. Here, for the sake of description, an example is illustrated in which nine chat rooms (1) to (9) are allocated to three talk servers 21', 22', and 23' in a distributed manner.

In the example of FIG. 7, three chat rooms (1), (5), and (9) are allocated to the first talk server 21', three chat rooms (2), (3), and (6) are allocated to the second talk server 22', and three chat rooms (4), (7), and (8) are allocated to the third talk server 23'. It is presumed to satisfy a condition that a difference between a processing load applied to the first talk server 21' performing a chat process related to the three chat rooms (1), (5), and (9), a processing load applied to the second talk server 22' performing a chat process related to the three chat rooms (2), (3), and (6), and a processing load applied to the third talk server 23' performing a chat process related to the three chat rooms (4), (7), and (8) is equal to or less than a predetermined value.

The delivery destination control unit 30B' of the chat management apparatus 30' controls the gateway apparatuses 11 and 12 so that a delivery destination of content posted from a user terminal 200 of a user belonging to a chat room is set to a talk server in which the corresponding chat room is set according to allocation by the room allocation unit 30A'. In the example in which nine chat rooms are allocated as in FIG. 7, with regard to content posted from the user terminal 200 of the user belonging to the first chat room, the first talk server 21' in which the active system chat room (1) is set is set as a delivery destination in the gateway apparatuses 11 and 12. Similarly, with regard to content posted from the user terminal 200 of the user belonging to the fourth chat room, the third talk server 23' in which the active system chat room (4) is set is set as a delivery destination in the gateway apparatuses 11 and 12.

The room allocation unit 30A' of the chat management apparatus 30' monitors the processing loads on the plurality of talk servers 21', 22', and 23'. When it is detected that the processing loads on the plurality of talk servers 21', 22', and 23' do not satisfy a predetermined condition related to uniformity, allocation of a plurality of chat rooms to the plurality of talk servers 21', 22', and 23' is re-executed to satisfy the predetermined condition related to uniformity.

For example, in an example in which nine chat rooms are allocated as in FIG. 7, for example, it is presumed that the processing load applied to the first talk server 21' has increased and a predetermined condition related to uniformity has not been satisfied since the number of participants in the first chat room (1) set in the first talk server 21' has increased and the number of posted contents has increased. In this case, the room allocation unit 30A' re-executes allocation to the plurality of talk servers 21', 22', and 23' to satisfy the predetermined condition related to uniformity for the nine chat rooms (1) to (9) set in the three talk servers 21', 22', and 23'.

Note that even when the nine chat rooms (1) to (9) set in the three talk servers 21', 22', and 23' are targeted, it is unnecessary to reset all the chat rooms in other talk servers 21', 22', and 23' which are different from previous ones. For example, it is sufficient that the predetermined condition related to uniformity is satisfied by moving at least one of a fifth chat room (5) and a ninth chat room (9) set in the first talk server 21' where the processing load has increased due to the first chat room (1) to the second talk server 22' or the third talk server 23'. When the predetermined condition may not be satisfied only by moving the fifth chat room (5) and the ninth chat room (9) to the second talk server 22' or the third talk server 23', other chat rooms originally set in the second talk server 22' or the third talk server 23' may be reset.

The room setting unit 20A' of each of the talk servers 21', 22', and 23' sets one or more chat rooms in each of the talk servers 21', 22', and 23' under the control of the room setting unit 20A' of the chat management apparatus 30'. Further, when the room allocation unit 30A' re-executes allocation of a plurality of chat rooms, the room setting unit 20A' resets one or more chat rooms in each of the talk servers 21', 22', and 23' according to allocation after re-execution.

When the chat rooms are reset, it is unnecessary for the plurality of talk servers 21', 22', and 23' to perform synchronization processing on content data exchanged through a chat process up to this point. That is, for example, when the first chat room (1) set in the first talk server 21' is moved to the second talk server 22' and reset, it is unnecessary to copy content data related to the first chat room (1) from the first talk server 21' to the second talk server 22' by synchronization processing. Further, since a connection state is maintained between the user terminal 200 and the gateway apparatus group 10 even during the chat room is reset, the user does not feel disconnected from the chat system 1 and can continue chatting only by experiencing a temporary decrease in performance.

The delivery destination control unit 30B' of the chat management apparatus 30 controls the gateway apparatuses 11 and 12 so that a delivery destination of content posted from the user terminal 200 of the user belonging to the chat room is set to talk servers 21', 22', and 23' in which the corresponding chat room is set according to allocation by the room allocation unit 30A'. When allocation of a plurality of chat rooms is re-executed by the room allocation unit 30A', the delivery destination control unit 30B' controls the gateway apparatuses 11 and 12 to switch the talk servers 21', 22', and 23' to which content is delivered according to allocation after re-execution.

Figure 8:
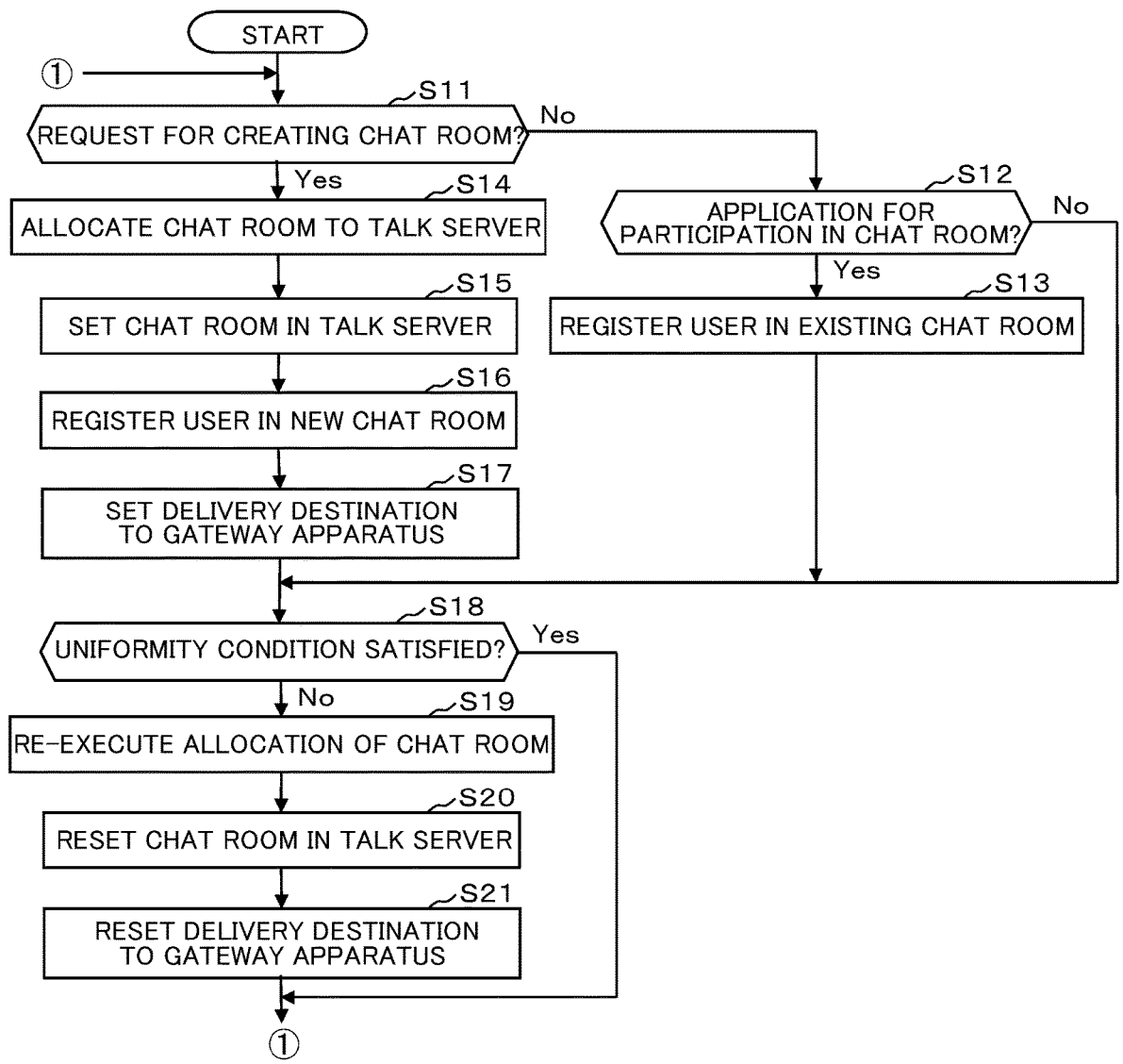
FIG. 8 is a flowchart illustrating an operation example of the chat system according to the second embodiment.

FIG. 8 is a flowchart illustrating an operation example of the chat system 1' according to the second embodiment configured as described above. The flowchart illustrated in FIG. 8 is continuously executed while the chat system 1' is operating.

First, the chat management apparatus 30' determines whether or not there is a request for creating a chat room from the user terminal 200 (step S11). When there is no request for creating a chat room, the chat management apparatus 30' further determines whether or not there is an application for participation in an existing chat room from the user terminal 200 (step S12). When there is an application for participation in the existing chat room, the chat management apparatus 30' registers a user applying for participation as a participant in the existing chat room (step S13). Thereafter, the process proceeds to step S18. Further, even when it is determined in step S12 that there is no application for participation in the existing chat room, the process proceeds to step S18.

When the chat management apparatus 30' determines in step S11 that there is a request for creating a chat room, the room allocation unit 30A' creates a new chat room, and allocates the created chat room to any of the talk servers 21' to 23' (that is a talk server 20'*) so that processing loads on the plurality of talk servers 21', 22', and 23' satisfy a predetermined condition related to uniformity (step S14).

Subsequently, the room setting unit 20A' of each of the talk servers 21, 22 and 23 sets the newly created chat room according to allocation by the room allocation unit 30A' of the chat management apparatus 30' (step S15). Then, the chat management apparatus 30' registers the user who requested creation of the chat room as a participant in the newly created chat room (step S16).

Further, the delivery destination control unit 30B' of the chat management apparatus 30' controls the gateway apparatuses 11 and 12 so that a delivery destination of content posted from the user terminal 200 of the user belonging to the chat room is set to a talk server in which the chat room is set according to allocation by the room allocation unit 30A' (step S17). Thereafter, the process proceeds to step S18.

In step S18, the room allocation unit 30A' of the chat management apparatus 30' monitors the processing loads on the plurality of talk servers 21', 22', and 23', and determines whether or not the processing loads on the plurality of talk servers 21', 22', and 23' satisfy a predetermined condition related to uniformity. When the predetermined condition is satisfied, the process returns to step S1. On the other hand, when it is determined that the predetermined condition is not satisfied, the room allocation unit 30A' re-executes allocation of the plurality of chat rooms to the plurality of talk servers 21', 22', and 23' to satisfy the predetermined condition related to uniformity (step S19).

When allocation of the chat rooms is re-executed, the room setting unit 20A' resets the chat rooms in the talk servers 21', 22', and 23' according to allocation after re-execution (step S20). Further, the delivery destination control unit 30B' controls the gateway apparatuses 11 and 12 to switch the talk servers 21', 22', and 23', which are delivery destinations of contents, according to allocation after the re-execution (step S21). Thereafter, the process returns to step S11.

As described in detail above, in the second embodiment, the room allocation unit 30A' of the chat management apparatus 30' monitors the processing loads on the plurality of talk servers 21', 22', and 23'. When it is detected that the processing loads do not satisfy a predetermined condition related to uniformity, the room allocation unit 30A' re-executes allocation of the plurality of chat rooms to the plurality of talk servers 21', 22', and 23' to satisfy the predetermined condition related to uniformity, and resets one or more chat rooms in the talk servers 21', 22', and 23' according to allocation after re-execution.

As described above, according to the second embodiment, in a case where the plurality of chat rooms is allocated to the plurality of talk servers 21', 22', and 23' in a distributed manner so that the processing loads on the plurality of talk servers 21', 22', and 23' satisfy the predetermined condition related to uniformity, even when the processing loads of some talk servers 20'* increase depending on the dynamically changing state of the chat rooms, if the processing loads do not satisfy the predetermined condition related to uniformity, allocation of the plurality of chat rooms to the plurality of talk servers 21', 22', and 23' is re-executed to satisfy the predetermined condition. As a result, according to the dynamically changing state of the chat rooms, allocation of the plurality of chat rooms is dynamically changed, and the state is maintained to satisfy the predetermined condition related to uniformity. Therefore, it is possible to suppress impairing of the response performance of the chat process as much as possible.

Further, when the chat rooms are reset in this way, it is unnecessary to perform synchronization processing on content data posted on the chat rooms. Therefore, some computational resources of the talk servers 21', 22', and 23' performing the chat process are not taken away by synchronization processing, and it is possible to suppress impairing of the response performance of the chat process as much as possible.

Note that the second embodiment described above may be applied in combination with the first embodiment. In this case, chat room reallocation may be performed only for the active system chat room or performed for both the active system chat room and the standby system chat room. In either case, the active system chat room and the standby system chat room corresponding thereto are not allocated to the same talk server 20'*.

In the first and second embodiments, an example in which the plurality of gateway apparatuses 11 and 12 is provided has been described. However, the invention is not limited thereto. For example, only one gateway apparatus may be provided. However, from a viewpoint that the processing load can be distributed, it is preferable to provide the plurality of gateway apparatuses 11 and 12.

Further, in the first and second embodiments, a description has been given of a configuration in which the talk server groups 20 and 20' perform a process related to posting of content and the data server 100 performs a process related to viewing of a history of the content. However, the invention is not limited thereto. For example, it is possible to adopt a configuration in which the talk server groups 20 and 20' perform both the process related to posting of content and the process related to viewing of a history. However, by dividing the processes as in the above embodiments, the talk server groups 20 and 20' can concentrate on a process related to posting of contents frequently performed from the plurality of user terminals 200 and posting reception notification for the user terminals 200 in response to posting of contents, and computational resources are not taken away by the process related to viewing the history. Thus, it is preferable in that the response performance related to posting of content can be improved.

Further, in the first and second embodiments, the number of gateway apparatus groups 10 and the number of talk server groups 20 and 20' are fixed. However, the invention is not limited thereto. For example, the number of uses may be increased or decreased depending on the status of the loads applied to the gateway apparatus group 10 and the talk server groups 20 and 20'. For example, when all the processing loads related to the plurality of talk servers 21, 22, and 23 exceed a predetermined threshold value, a new talk server is automatically added. When the talk server group 20 is a virtual machine used in a cloud environment, it is possible to add a new talk server on demand.

In addition, the first and second embodiments described above are merely examples of materialization in carrying out the invention, and the technical scope of the invention should not be construed in a limited manner by these embodiments. That is, the invention can be implemented in various forms without departing from the gist or main features.

What is claimed is:

1. A chat system comprising:
a plurality of talk servers;
a gateway apparatus that allocates and delivers content posted from a user terminal to the plurality of talk servers; and
a chat management apparatus that controls the plurality of talk servers and the gateway apparatus,
wherein each of the plurality of talk servers includes a processor; and a hardware memory storing: a room setting unit that sets one or more chat rooms of a plurality of chat rooms under control of the chat management apparatus, and a posting-related processing unit that receives content, which is posted from a user terminal of a user belonging to the chat room via the gateway apparatus, by the corresponding chat room, supplies the received content to an independent external storage apparatus different from the plurality of talk servers and stores the content in a database,
the gateway apparatus includes a hardware memory storing an allocation and delivery unit that delivers the content posted from the user terminal of the user belonging to the chat room to a talk server of the plurality of chat rooms in which the corresponding chat room is set,
the chat management apparatus includes a hardware memory storing a room allocation unit that allocates the plurality of chat rooms to the plurality of talk servers in a distributed and redundant manner, and a delivery destination control unit that sets, by controlling the gateway apparatus, a delivery destination of the content posted from the user terminal of the user belonging to the chat room to the talk server in which the corresponding chat room is set according to allocation by the room allocation unit, and the delivery destination control unit monitors an operating status of the plurality of talk servers, and controls the gateway apparatus when it is detected that a failure has occurred in one talk server of the plurality of talk servers, to switch from the one talk server to another talk server of the plurality of talk servers.

2. The chat system according to claim 1,
wherein the room allocation unit sets an active system and a standby system for each of the plurality of chat rooms, allocates a plurality of active system chat rooms to the plurality of talk servers in a distributed manner, and allocates in the distributed manner a plurality of standby system chat rooms to the plurality of talk servers which are not the same as the talk servers of the corresponding active system chat rooms, the delivery destination control unit sets, by controlling the gateway apparatus, a delivery destination of the content posted from the user terminal of the user belonging to the chat room to a talk server of the plurality of talk servers in which the corresponding active system chat rooms are set according to allocation by the room allocation unit, and
the delivery destination control unit monitors an operating status of the plurality of talk servers, and controls the gateway apparatus when it is detected that a failure has occurred in the one talk server of the plurality of talk servers, to switch from the one talk server to another talk server of the plurality of talk servers in which standby system chat rooms corresponding to active system chat rooms set in the one talk server are set.

3. The chat system according to claim 1, wherein the room allocation unit allocates the plurality of chat rooms to the plurality of talk servers in a distributed manner to make processing loads on the plurality of talk servers satisfy a predetermined condition related to uniformity.

4. The chat system according to claim 2, wherein the room allocation unit allocates the plurality of active system chat rooms to the plurality of talk servers in the distributed manner to make processing loads on the plurality of talk servers satisfy a predetermined condition related to uniformity, and allocates in the distributed manner the plurality of standby system chat rooms to the plurality of talk servers which are not the same as the plurality of talk servers of the corresponding active system chat rooms.

5. The chat system according to claim 3,
wherein the room allocation unit monitors the processing loads on the plurality of talk servers, and re-executes allocation of the plurality of chat rooms to the plurality of talk servers to satisfy the predetermined condition related to uniformity when it is detected that the processing loads on the plurality of talk servers do not satisfy the predetermined condition related to uniformity, when allocation of the plurality of chat rooms is re-executed by the room allocation unit, the room setting unit resets the one or more chat rooms according to allocation after re-execution, and when allocation of the plurality of chat rooms is re-executed by the room allocation unit, the delivery destination control unit controls the gateway apparatus to switch a talk server to which content is delivered according to allocation after re-execution.

6. A chat system comprising:
a plurality of talk servers;
a gateway apparatus that allocates and delivers content posted from a user terminal to the plurality of talk servers; and
a chat management apparatus that controls the plurality of talk servers and the gateway apparatus,
wherein each of the plurality of talk servers includes a memory storing a room setting unit that sets one or more chat rooms of a plurality of chat rooms under control of the chat management apparatus, and a posting-related processing unit that receives content, which is posted from a user terminal of a user belonging to a chat room via the gateway apparatus, by the corresponding chat room, supplies the received content to an independent external storage apparatus different from the plurality of talk servers and stores the content in a database,
the gateway apparatus includes a memory storing an allocation and delivery unit that delivers the content posted from the user terminal of the user belonging to the chat room to a talk server of the plurality of chat rooms in which the corresponding chat room is set,
the chat management apparatus includes a memory storing a room allocation unit that allocates the plurality of chat rooms to the plurality of talk servers in a distributed manner to make processing loads on the plurality of talk servers satisfy a predetermined condition related to uniformity, and
a delivery destination control unit that sets, by controlling the gateway apparatus, a delivery destination of the content posted from the user terminal of the user belonging to the chat room to the talk server in which the corresponding chat room is set according to allocation by the room allocation unit,
the room allocation unit monitors the processing loads on the plurality of talk servers, and re-executes allocation of the plurality of chat rooms to the plurality of talk servers to satisfy the predetermined condition related to uniformity when the processing loads on the plurality of talk servers do not satisfy the predetermined condition related to uniformity,
the room setting unit resets the one or more chat rooms according to allocation after re-execution when allocation of the plurality of chat rooms is re-executed by the room allocation unit, and
the delivery destination control unit controls the gateway apparatus to switch a talk server of the plurality of talk servers to which the content is delivered according to allocation after re-execution when allocation of the plurality of chat rooms is re-executed by the room allocation unit.

7. A chat management apparatus for controlling a plurality of talk servers, each of the plurality of talk servers comprises a plurality of chat rooms, each of the plurality of talk servers performs a process of receiving content posted from a user terminal of a user belonging to a chat room by a corresponding chat room, supplying the received content to an independent external storage apparatus different from the plurality of talk servers and storing the content in a database, and a gateway apparatus that allocates and delivers the content posted from the user terminal to the plurality of talk servers, the chat management apparatus comprising:
a processor;
a hardware memory storing a room allocation unit that allocates the plurality of chat rooms to the plurality of talk servers in a distributed and redundant manner; and
a delivery destination control unit that sets, by controlling the gateway apparatus, a delivery destination of the content posted from the user terminal of the user belonging to the chat room to a talk server in which the corresponding chat room is set according to allocation by the room allocation unit,
wherein the delivery destination control unit monitors an operating status of the plurality of talk servers, and controls the gateway apparatus when it is detected that a failure has occurred in one talk server of the plurality of the talk servers, to switch from the one talk server to another talk server of the plurality of talk servers.

8. The chat management apparatus according to claim 7, wherein the room allocation unit sets an active system and a standby system for each of the plurality of chat rooms, allocates a plurality of active system chat rooms to the plurality of talk servers in a distributed manner, and allocates in the distributed manner a plurality of standby system chat rooms to the plurality of talk servers which are not the same as the talk servers of the corresponding active system chat rooms,
the delivery destination control unit sets, by controlling the gateway apparatus, a delivery destination of the content posted from the user terminal of the user belonging to the chat room to a talk server in which the corresponding active system chat rooms are set according to allocation by the room allocation unit, and
the delivery destination control unit monitors an operating status of the plurality of talk servers, and controls the gateway apparatus when it is detected that a failure has occurred in one talk server of the plurality of talk servers, to switch from the one talk server to another talk server of the plurality of talk servers in which standby system chat rooms corresponding to active system chat rooms set in the one talk server are set.

9. The chat management apparatus according to claim 7, wherein the room allocation unit allocates the plurality of chat rooms to the plurality of talk servers in a distributed manner to make processing loads on the plurality of talk servers satisfy a predetermined condition related to uniformity.

10. The chat management apparatus according to claim 8, wherein the room allocation unit allocates the plurality of active system chat rooms to the plurality of talk servers in a distributed manner to make processing loads on the plurality of talk servers satisfy a predetermined condition related to uniformity, and allocates in a distributed manner the plurality of standby system chat rooms to the plurality of talk servers which are not the same as the talk servers of the corresponding active system chat rooms.

11. The chat management apparatus according to claim 9, wherein the room allocation unit monitors the processing loads on the plurality of talk servers, and re-executes allocation of the plurality of chat rooms to the plurality of talk servers to satisfy the predetermined condition related to uniformity when it is detected that the processing loads on the plurality of talk servers do not satisfy the predetermined condition related to uniformity, and when allocation of the plurality of chat rooms is re-executed by the room allocation unit, the delivery destination control unit controls the gateway apparatus to switch a talk server to which content is delivered according to allocation after re-execution.

12. A chat management apparatus for controlling a plurality of talk servers, each of the plurality of talk servers comprises a plurality of chat rooms, each of the plurality of talk servers performs a process of receiving content posted from a user terminal of a user belonging to a chat room by the corresponding chat room, supplying the received content to an independent external storage apparatus different from the plurality of talk servers and storing the content in a database to store the content, and a gateway apparatus that allocates and delivers the content posted from the user terminal to the plurality of talk servers, the chat management apparatus comprising:

a processor;
a hardware memory storing:
a room allocation unit that allocates a plurality of chat rooms to the plurality of talk servers in a distributed manner to make processing loads on the plurality of talk servers satisfy a predetermined condition related to uniformity; and
a delivery destination control unit that sets, by controlling the gateway apparatus, a delivery destination of the content posted from the user terminal of the user belonging to the chat room to a talk server in which the corresponding chat room is set according to allocation by the room allocation unit, wherein the room allocation unit monitors the processing loads on the plurality of talk servers, and re-executes allocation of the plurality of chat rooms to the plurality of talk servers to satisfy the predetermined condition related to uniformity when the processing loads on the plurality of talk servers do not satisfy the predetermined condition related to uniformity, and the delivery destination control unit controls the gateway apparatus to switch one talk server of the plurality of talk servers to which the content is delivered according to allocation after re-execution when allocation of the plurality of chat rooms is re-executed by the room allocation unit.

13. The chat system according to claim 4, wherein the room allocation unit monitors the processing loads on the plurality of talk servers, and re-executes allocation of the plurality of chat rooms to the plurality of talk servers to satisfy the predetermined condition related to uniformity when it is detected that the processing loads on the plurality of talk servers do not satisfy the predetermined condition related to uniformity, when allocation of the plurality of chat rooms is re-executed by the room allocation unit, the room setting unit resets the one or more chat rooms according to allocation after re-execution, and when allocation of the plurality of chat rooms is re-executed by the room allocation unit, the delivery destination control unit controls the gateway apparatus to switch a talk server to which content is delivered according to allocation after re-execution.

14. The chat management apparatus according to claim 10,
wherein the room allocation unit monitors the processing loads on the plurality of talk servers, and re-executes allocation of the plurality of chat rooms to the plurality of talk servers to satisfy the predetermined condition related to uniformity when it is detected that the processing loads on the plurality of talk servers do not satisfy the predetermined condition related to uniformity, and when allocation of the plurality of chat rooms is re-executed by the room allocation unit, the delivery destination control unit controls the gateway apparatus to switch a talk server to which content is delivered according to allocation after re-execution.

* * * * *